No. 672,996. Patented Apr. 30, 1901.
A. WOOLNER, Jr.
PROCESS OF CONVERTING STARCHES.
(Application filed Apr. 10, 1900.)
(No Model.)
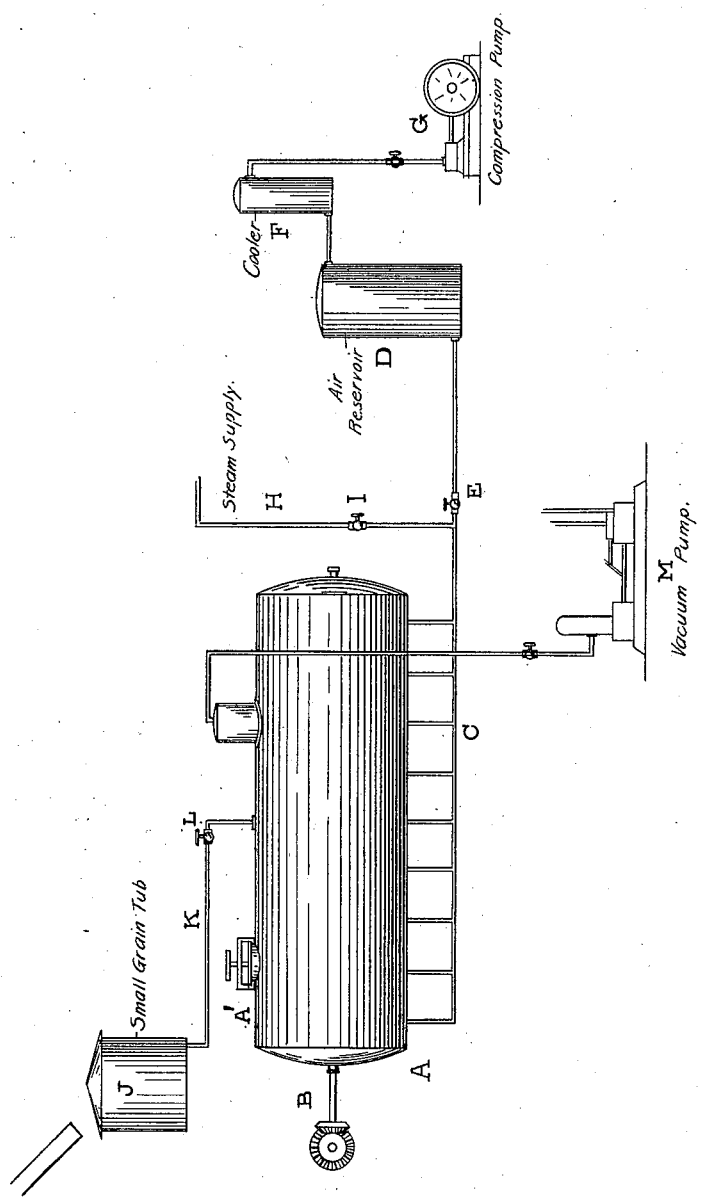
WITNESSES
J. C. Walker
C. Johnson
INVENTOR.
Adolph Woolner Jr.
By L. M. Thurlow,
ATTY.

UNITED STATES PATENT OFFICE.

ADOLPH WOOLNER, JR., OF PEORIA, ILLINOIS.

PROCESS OF CONVERTING STARCHES.

SPECIFICATION forming part of Letters Patent No. 672,996, dated April 30, 1901.

Application filed April 10, 1900. Serial No. 12,242. (No specimens.)

*To all whom it may concern:*

Be it known that I, ADOLPH WOOLNER, Jr., a citizen of the United States, residing at Peoria, in the county of Peoria and State of Illinois, have invented certain new and useful Improvements in Processes of Converting Starches; and I do hereby declare that the following is a full, clear, and exact description of the invention, which will enable others skilled in the art to which it appertains to make and use the same.

My invention relates to methods of converting starches of various grains into sugar, dextrose, and maltose by the addition thereto of malt or diastase in the manufacture of whisky, alcohol, beer, compressed yeast, and the like.

The object of the present invention is to accomplish the conversion of the starches under air-pressure.

In making whisky the mash is cooked by steam in a closed vessel to the desired point and then cooled to the temperature known as the "converting" temperature. Then by the addition of malt or diastase the starches of the various grains are converted into sugar. The common method of conversion of these starches after they have been cooked to the required degree in a mash-tub or in a closed vessel termed a "cooker" at a temperature of 186° to 310°, is to add the small grain constituting the malt for converting purposes, which is allowed to remain for several hours to accomplish the conversion with no pressure upon it other than the ordinary atmospheric pressure of fifteen pounds to the inch. Still another method is to add the malt to the starchy material and subject the combined materials to a treatment in which a temperature running as high as 175° Fahrenheit is employed; but at a temperature as high as this the diastase of the malt is found to be injured and rendered unfit for converting purposes. It is my purpose therefore, in view of these slow and improper processes, to provide a safe and reliable method, which will be presently described.

My invention consists in subjecting the mash, after the malt or diastase has been added, to a high pressure of cool or cold compressed air to force the diastase extract into the starch of the mash, so that it will become perfectly soluble and at the same time be brought into contact with all parts of the grains and mash, and thereby be perfectly converted. This is accomplished by the means hereinafter set forth.

I am aware that air-pressure for assisting the conversion is not new; but the pressure used is too low to be practical or warrant the construction of mechanical means for carrying the process into extensive use. Furthermore, the temperature used in connection with the process is too high, and, as before stated, is dangerous to the extent that the diastase is destroyed before its converting action is had. It is my purpose to reverse the usual practice by using a very high pressure and a very low temperature at the same time. This will be clearly understood as the description proceeds.

In the accompanying drawings, which I have presented with a view to making the process more clearly understood, A represents the cooker ordinarily used in distilleries, into which the materials for making the mash are introduced through the manhole A'.

B indicates the usual mechanism for revolving the rake within the cooker for agitating the mash.

C is a pipe, with its lateral branches for conveying steam to the cooker in the ordinary manner through the pipe H and valve I, all of which, however, are common to distillery systems of to-day. Connected with the pipe C is a pipe for conveying air from a reservoir D, in which air is compressed through the valve E.

F is a cooler of any desired form for lowering the temperature of the air passing through it from a compressing-pump G and stored under pressure in said reservoir.

J indicates the small grain-tub containing the malt, which is located above the cooker and whose contents are emptied into the latter through pipe K and valve L after the mash has been sufficiently cooked. A vacuum-pump M is connected with the dome of the cooker for exhausting the air, as in ordinary practice.

I employ cool or cold compressed air in my improved converting process for the reason that the use of steam, which would be the only other method, would raise the temperature to such a high degree in the attempt to gain the proper pressure that the converting power of the diastase of the malt would be lost, as is well known. Since this would result, I employ cool compressed air, and thereby keep the mash at about 145° Fahrenheit or even lower. After the mash has been cooked to the desired extent in the cooker A the steam-valve is closed. The mash is then cooled down in vacuum or by any desired process to the desired temperature for receiving the malt or diastase of 130° to 145°. When this decreased temperature obtains, the valve I is opened to carry the malt or diastase from the small grain-tub J into the cooker in order to convert the starches of the mash into sugar, as before described. The amount of malt used is about twelve per cent. of the entire bulk of mash, though the exact proportion is not vital to success. At the time this addition is made the mash should have a temperature as above stated; but the succeeding conversion would obtain equally well at a much lower temperature. Now in order to make a more perfect conversion than that of permitting the starch and malt or diastase to combine naturally I open the valve E and admit cool or cold compressed air from the reservoir D to the cooker at a temperature of about 50° and subject the combined products to a very high pressure therefrom. I use cool or cold compressed air at the temperature named for the reason that air at an ordinary temperature would be quickly heated in the cooker and would not aid in keeping the temperature in the cooker constantly lowering; but if the air is admitted continually at so low a temperature the mash is constantly cooled. The air is admitted to the products immediately after the introduction of the malt and is maintained at a pressure of as high as one hundred pounds to the inch for a period of sixty minutes or more, if desired, though this length of time is found to be sufficient to effect the entire conversion. In treating starches with green malt the process is substantially the same as that described, and the same is true when the process is conducted with a view to the ultimate production of beer. No cooking of the malt is necessary after it is added to the mash; but the air-pressure is kept up for the time mentioned, after which it is relieved and the contents of the cooker carried to the proper receptacle for making beer or whisky or other products. These various succeeding steps, however, do not lie within the province of this application. Treating the mash with cooled compressed air in the manner described is a great advantage, as it increases the yield of whisky or alcohol from a given amount of malt and decreases the cost of manufacture, as a less quantity of this material is required for the conversion than heretofore, and the work is more thoroughly and quickly accomplished. It is especially advantageous when green malt is used, as the high pressure under which the conversion takes place is such that the diastase extract is forced into the starch and becomes perfectly soluble, as before explained. This means much to the distiller, as the energy of the yeast is increased, and the yield of whisky is larger. When compressed yeast is manufactured, it is rendered purer and stronger. The air-pressure may be used at any height desired, as no injury to the malt or mash will result.

The mechanical means for carrying out the process may be of any design, as I attach no claim thereto; but

What I claim, and desire to secure by Letters Patent, is—

1. The process of converting starches into sugar, dextrose and maltose which consists in combining malt or diastase with mash which has been previously cooked and cooled and from which the air has been exhausted, then placing the combined products under air-pressure of one hundred pounds per inch, more or less, at a temperature of about 50° Fahrenheit whereby the temperature of the said products is kept below 145° Fahrenheit or within a safe limit where no injury to the diastase of the malt will result during the converting operation.

2. The process of cooking the starches of grains in a closed vessel for the requisite length of time, cooling the product to a temperature of about 145°, combining malt with the cooked material, subjecting the combined products to an air-pressure of one hundred pounds at a temperature of about 50° Fahrenheit for the air whereby the material is kept cool and by the pressure the diastase of the malt is made to convert the starches of the grains into sugar as set forth.

In testimony whereof I affix my signature in presence of two witnesses.

ADOLPH WOOLNER, JR.

Witnesses:
OTTO BAEK,
A. W. KORSOSKI.